United States Patent
Yamada

[11] Patent Number: 6,009,215
[45] Date of Patent: Dec. 28, 1999

[54] IMAGE READER

[75] Inventor: Akito Yamada, Fukuoka, Japan

[73] Assignee: Matsushita Electric Industrial Co., Ltd., Osaka, Japan

[21] Appl. No.: 08/886,973

[22] Filed: Jul. 2, 1997

[30] Foreign Application Priority Data

Jul. 4, 1996 [JP] Japan .................................. 8-174716

[51] Int. Cl.[6] .................................................. G06K 7/10
[52] U.S. Cl. .......................................... 382/321; 382/312
[58] Field of Search ..................................... 382/321, 270, 382/312; 358/474, 475, 466, 494, 500

[56] References Cited

U.S. PATENT DOCUMENTS

| | | | |
|---|---|---|---|
| 5,070,414 | 12/1991 | Tsutsumi | 358/466 |
| 5,121,230 | 6/1992 | Honma et al. | 358/500 |
| 5,566,006 | 10/1996 | Yoshinaga et al. | 358/475 |
| 5,712,929 | 1/1998 | Kawamura et al. | 382/270 |

*Primary Examiner*—Jose L. Couso
*Assistant Examiner*—Anh Hong Do
*Attorney, Agent, or Firm*—Venable; Robert J. Frank; Allen Wood

[57] ABSTRACT

In an image reader, an original is irradiated with a light source. A reading of the original in a main scan direction is performed for each line by a line sensor. An optical system is movable relative to the original in a subsidiary scan direction of the original. The relative movement of the original and the optical system in the subsidiary scan direction is caused by a driving section. A line clamp of a DC level of an output signal of the line sensor is performed by a line clamp section. The timing at which the line clamp is to be performed and the presence/absence of the line clamp are controlled by a control section.

3 Claims, 11 Drawing Sheets

FIG. 9A PRIOR ART  SHIFT PULSE SIGNAL
FIG. 9B PRIOR ART  TRANSFER CLOCK
FIG. 9C PRIOR ART  LINE SENSOR OUTPUT SIGNAL
FIG. 9D PRIOR ART  SAMPLE PULSE
FIG. 9E PRIOR ART  OUTPUT SIGNAL c OF LINE SENSOR (SAMPLE HOLD OUTPUT)

FIG.10A PRIOR ART HORIZONTAL SYNC SIGNAL

FIG.10B PRIOR ART INVERTED VERSION OF OUTPUT SIGNAL c OF LINE SENSOR

FIG.10C PRIOR ART LINE CLAMP PULSE

FIG.11A PRIOR ART HORIZONTAL SYNC SIGNAL

FIG.11B PRIOR ART OUTPUT SIGNAL c OF LINE SENSOR

FIG.11C PRIOR ART INVERTED SIGNAL

FIG.11D PRIOR ART LINE CLAMP PULSE

FIG.11E PRIOR ART RESPONSE WAVEFORM

FIG.11F PRIOR ART ized signal is resynchronized so as to always keep

IMAGE READER

BACKGROUND OF THE INVENTION

1. Field of the Invention

The present invention relates to an image reader for a scanner, copier or the like provided with a reading position alignment function.

2. Description of the Related Art

In recent years, a flat bed type image scanner device capable of inputting an image in a simple manner has come into wide use. The coordination of the image scanner device and a host device during transfer exists as a problem associated with the improvement in the precision of image reading and the improvement in the image reading speed. Especially, in the case where the image reading speed of the image scanner device is higher than the data transfer speed of the host device, it is necessary to coordinate these devices by use of any means.

In such a case, storing image data of the image scanner device into a buffer memory, stopping an image reading operation in progress, and so forth are measures that are generally taken. The former measure of storing the image data into the buffer memory and then making the transmission corresponding to the processing speed of the host device is effective and easy. However, the amount of image data to be handled has been increased in association with the improvement in resolution and the treatment of a color image and hence the provision of a buffer memory corresponding to one image results in a high cost. As a result, it cannot be said that this measure is expedient.

The latter measure is a more simple and economical measure and involves of temporarily stopping the reading operation. In a device having such a temporary stop function, in order to avoid a deviation in the reading position in the case where a rereading operation is performed after the temporary stop of a reading operation, a horizontal synchronizing signal is resynchronized so as to always keep the storage time of a line sensor (mentioned just below) constant. Thereby, double reading of an image or a miss in reading is prevented.

The line sensor is composed of a light receiving portion including a multiplicity of aligned light receiving elements for photoelectric conversion, a transfer portion including shift registers provided corresponding to the respective light receiving elements, and a gate portion provided between the light receiving portion and the transfer portion. Each light receiving element of the light receiving portion generates electric charges corresponding to a received light amount and the generated charges are stored thereinto in accordance with the lapse of time. At a point of time when the gate is opened by a shift pulse signal after the lapse of a predetermined charge storage time, the stored charges are all transported to the corresponding shift register. The charges transported to each shift register of the transfer portion are transferred in accordance with transfer clocks successively applied to the shift registers and are outputted as a serial signal from an output terminal.

Figure 9A:
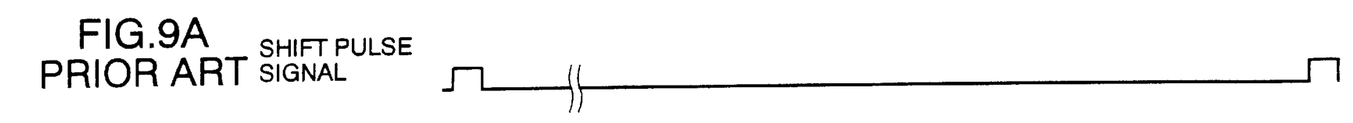
FIG. 9A is a timing chart showing a shift pulse signal.
Figure 9B:
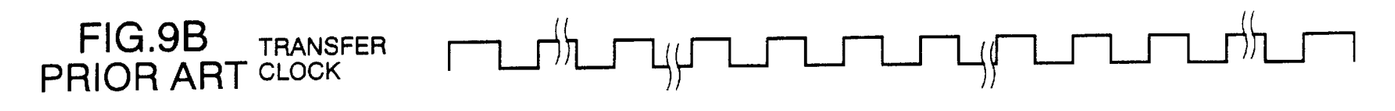
FIG. 9B a timing chart showing a transfer clock for each pixel.
Figure 9C:
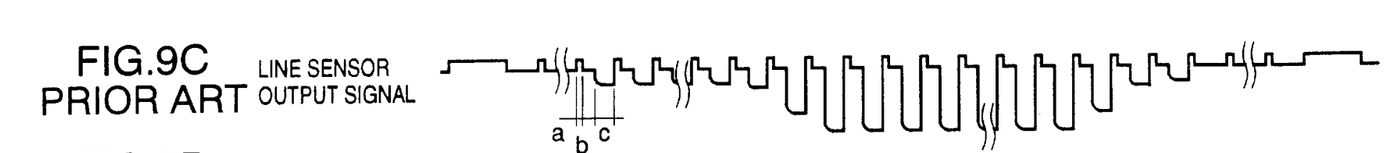
FIG. 9C a timing chart showing a line sensor output signal.
Figure 9D:
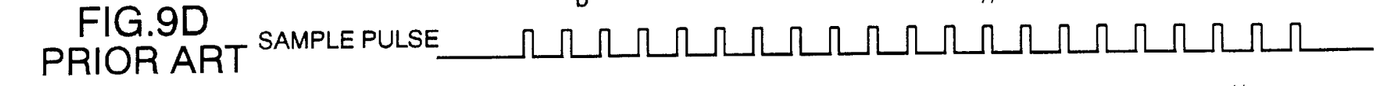
FIG. 9D a timing chart showing a sample pulse.
Figure 9E:
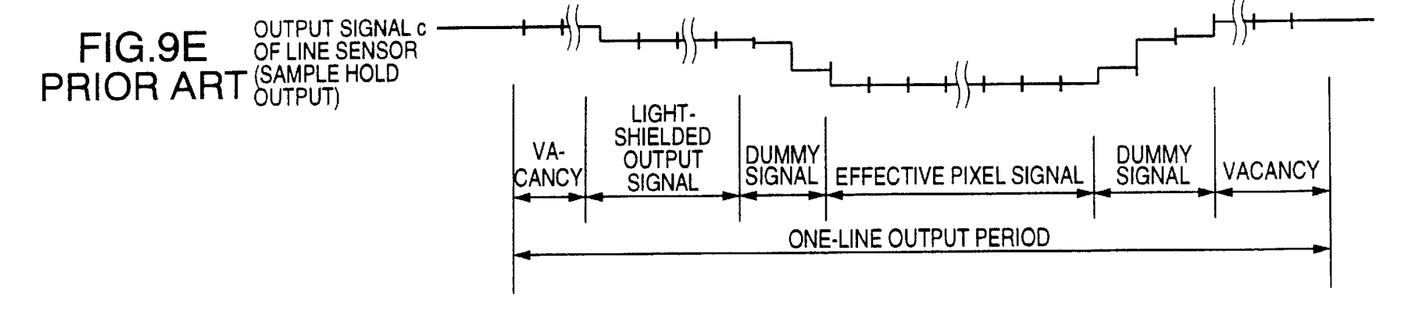
FIG. 9E a timing chart showing a sample hold signal of a line sensor.

FIG. 9A is a timing chart showing a shift pulse signal, FIG. 9B as a timing chart showing a transfer clock for each pixel, FIG. 9C is a timing chart showing a line sensor output signal, FIG. 9D is a timing chart showing a sample pulse, and FIG. 9E is a timing chart showing an output signal (or sample hold output signal) c of the line sensor. The line sensor output signal shown in FIG. 9C includes a reset pulse signal a, a field through signal b and the output signal c.

Also, the line sensor has a sample and hold circuit and a line clamp circuit for performing a line clamp by the field through signal b. As shown in FIG. 9E, the output signal c of the line sensor has a light-shielded output signal and an effective pixel signal for each line. The light-shielded output signal is a signal indicative of a dark output level of the line sensor and is used as an offset voltage in the case where a line clamp is performed for each line. In general, the signal processing of the output signal c of the line sensor as an analog signal is such that the output signal c of the line sensor after amplified in its AC level is DC-clamped with the level of the light-shielded output signal taken as an offset level (that is, the level of the light-shielded output signal is clamped to a fixed DC level), and then A/D conversion is performed.

Figure 10A:
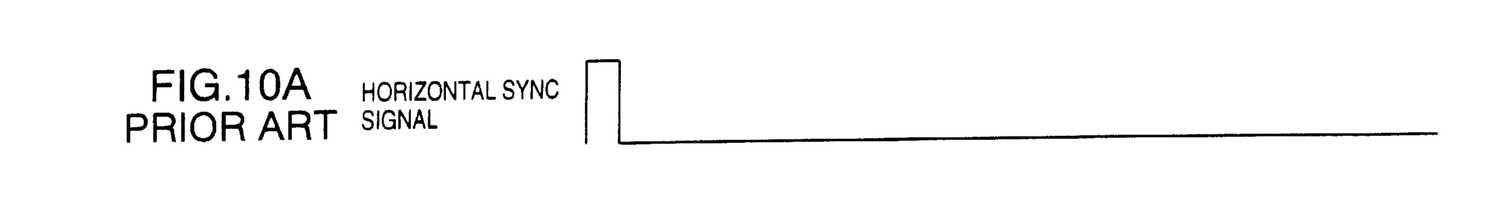
FIG. 10A is a timing chart showing a horizontal synchronizing signal.
Figure 10B:
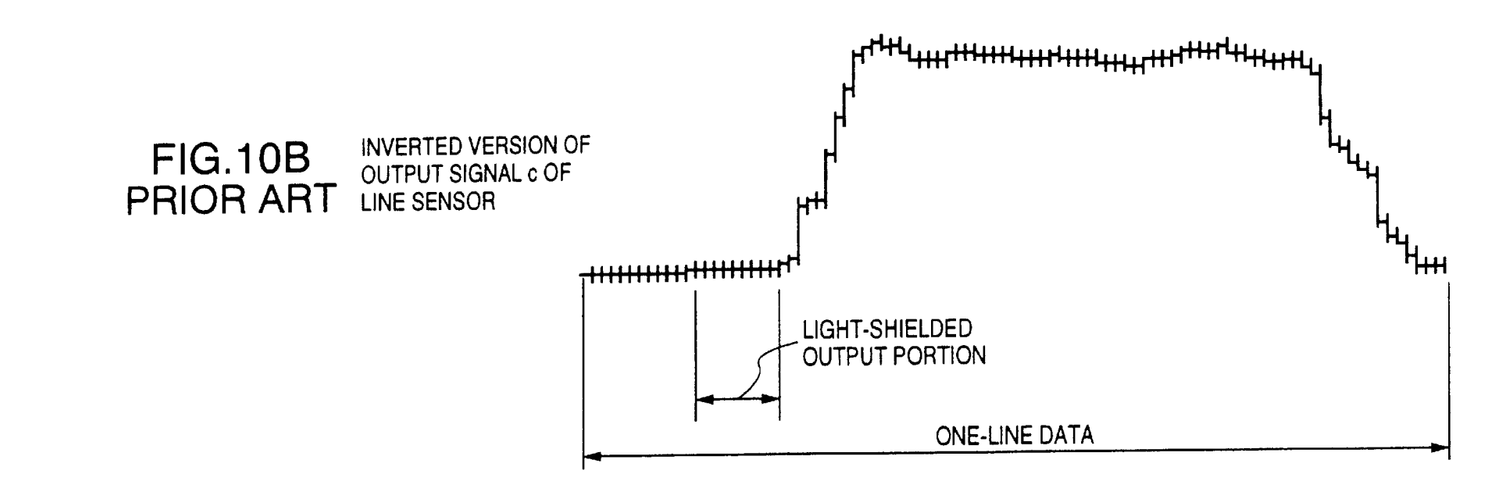
FIG. 10B a timing chart showing an inverted version of an output signal of a line sensor.
Figure 10C:
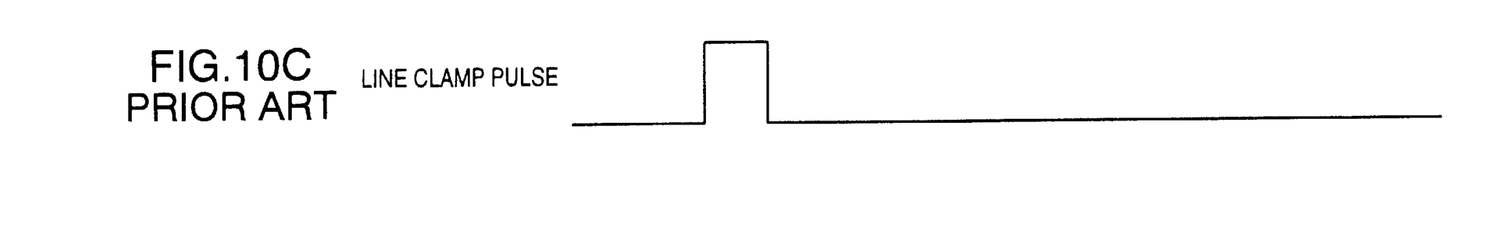
FIG. 10C a timing chart showing a line clamp pulse signal.

Next, FIGS. 10A to 10C will be used to explain a line clamp pulse defining timing at which the above-mentioned DC clamp is performed. FIG. 10A is a timing chart showing a horizontal synchronizing signal, FIG. 10B is a timing chart showing an inverted version of the output signal c of the line sensor, and FIG. 10C is a timing chart showing a line clamp pulse. As shown in FIGS. 10A to 10C, the line clamp pulse is generated at the same period as the horizontal synchronizing signal (equivalent to the shift pulse signal shown in FIG. 9A) and at a timing at which the light-shielded output signal of the line sensor is outputted.

As a responsibility at the time of charging and discharging of an offset voltage for a coupling condenser in the above-mentioned DC clamp, it is preferable that the charging and discharging are completed within the duration of one line clamp pulse. As a storage time and a transfer clock period are shortened due to the improvement of the reading speed, the completion of the response within a light-shielded output signal generation time requires a high-speed clamp buffer. However, even if the response is not completed within the light-shielded output signal generation time of the line sensor corresponding to one line, the completion of the response in a warm-up period after the turn-on of a power supply suffices to provide a function as the offset control since the potential of the coupling condenser after that is little.

Figure 11A:
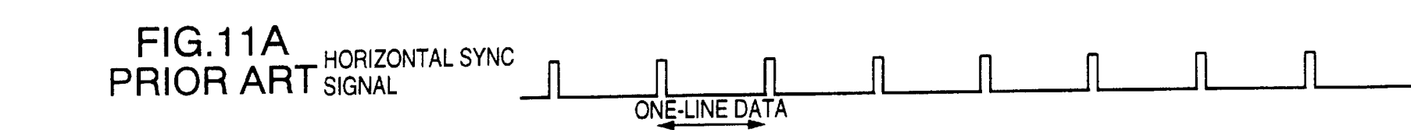
FIG. 11A is a timing chart showing a horizontal synchronizing signal.
Figure 11B:
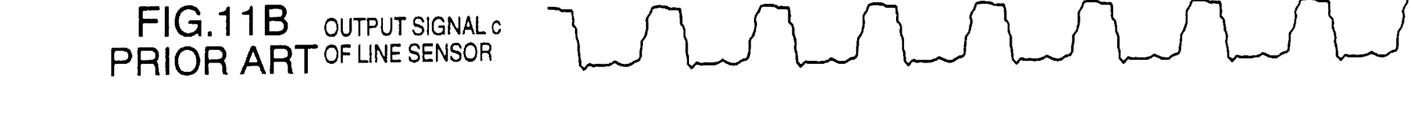
FIG. 11B a timing chart showing an output signal of a line sensor.
Figure 11C:
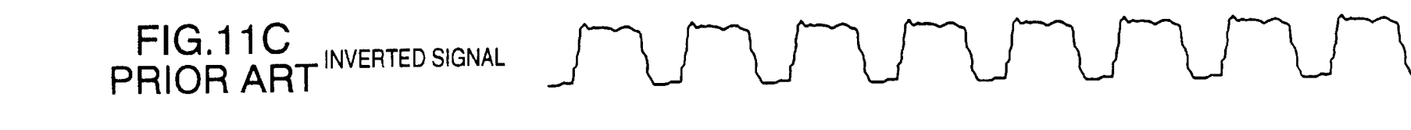
FIG. 11C a timing chart showing an inverted version of the output signal of the line sensor.
Figure 11D:
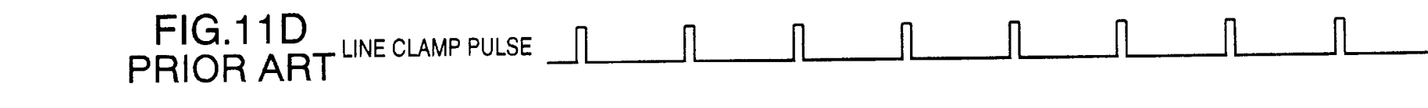
FIG. 11D a timing chart showing a line clamp pulse.
Figure 11E:
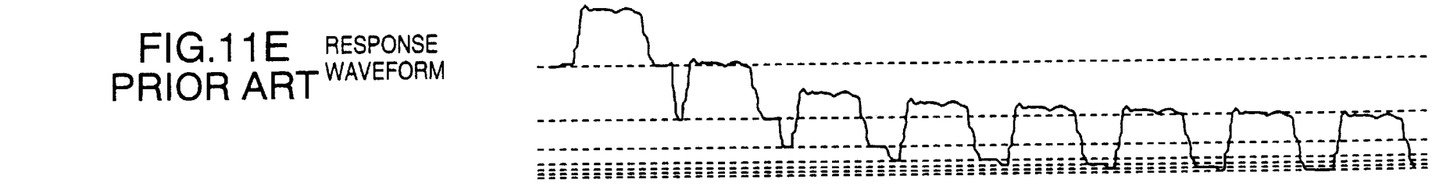
FIG. 11E a timing chart showing a response waveform of the output signal of the line sensor in a warm-up period.
Figure 11F:
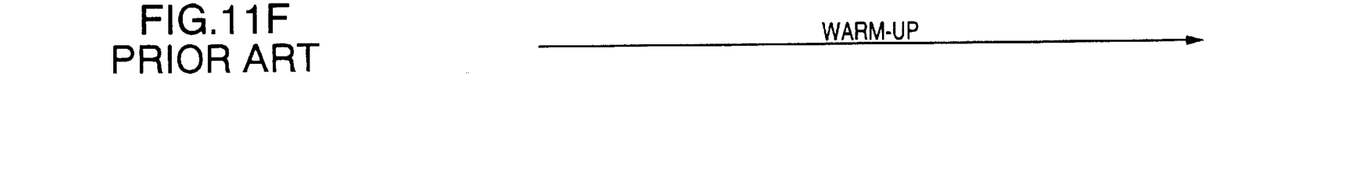
FIG. 11F a timing chart showing the warm-up period.

This will now be explained using FIGS. 11A to 11F. FIG. 11A is a timing chart showing a horizontal synchronizing signal, FIG. 11B is a timing chart showing an output signal c of the line sensor, FIG. 11C is a timing chart showing an inverted version of the output signal c of the line sensor, FIG. 11D is a timing chart showing a line clamp pulse, FIG. 11E is a timing chart showing a response waveform of the output signal c of the line sensor in a warm-up period, and FIG. 11F is a timing chart showing the warm-up period. Even if about seven lines are taken to obtain a target DC level in the line clamp, as shown in FIG. 11E, the response in the case of a storage time of 3 msec per one line can be completed if there is a standby time of about 3×7=21 msec. If the response is once completed, there is little a change after that and hence a convergence into the tolerance of the target DC level is possible by the line clamp for every line.

Figure 12A:
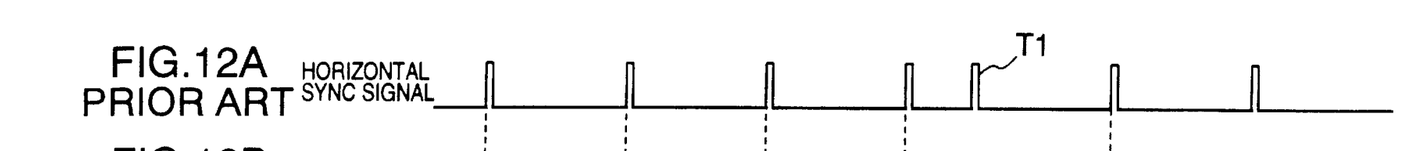
FIG. 12A is a timing chart showing a horizontal synchronizing signal.
Figure 12B:
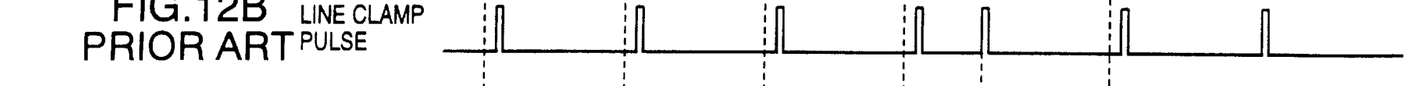
FIG. 12B a timing chart showing a line clamp pulse.
Figure 12C:
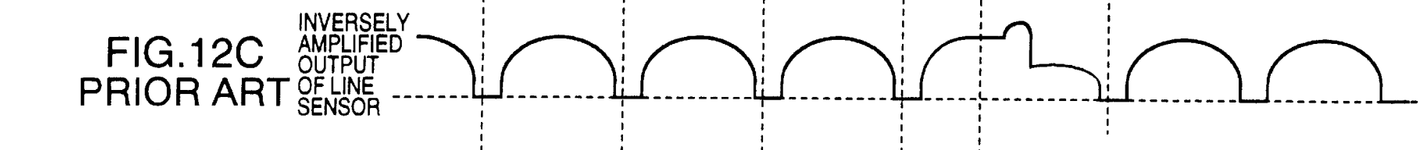
FIG. 12C a timing chart showing an inverted amplifier output signal of a line sensor.
Figure 12D:
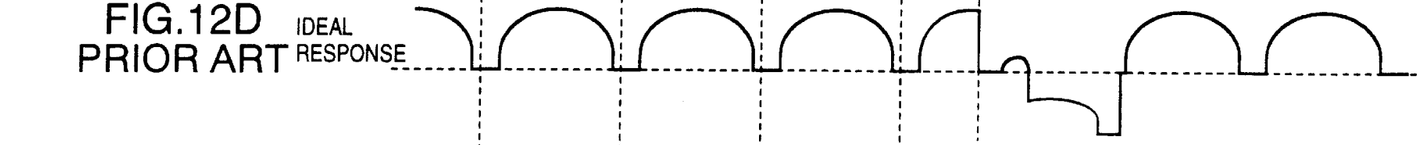
FIG. 12D a timing chart showing an ideal response waveform in a line clamp.
Figure 12E:
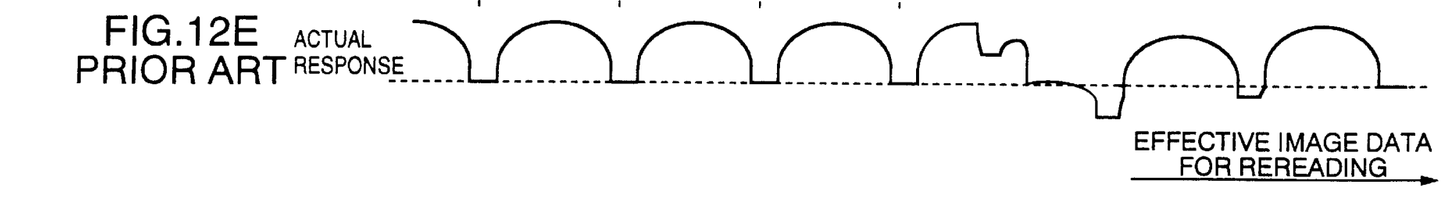
FIG. 12E a timing chart showing an actual response waveform in the line clamp.

However, when a buffer over-run is generated in the course of the reading of an image, a different situation may be encountered. This will be explained using FIGS. 12A to 12E. FIG. 12A is a timing chart showing a horizontal synchronizing signal, FIG. 12B is a timing chart showing a line clamp pulse, FIG. 12C is a timing chart showing an inversely amplified output signal of the line sensor, FIG. 12D is a timing chart showing an ideal response waveform in the line clamp, and FIG. 12E is a timing chart showing an actual response waveform in the line clamp. When the horizontal synchronizing signal is resynchronized due to the generation of a buffer over-run in the course of the reading of an image (see a resynchronizing point T1 in FIG. 12A associated with the restart of reading), the line sensor encounters the case where the period of the shift pulse is shorter than the time in which image data corresponding to one line is transferred, that is, a time equal to (the transfer time per one pixel)×(the number of pixels). In this case, image data in the preceding time remaining untransferred is outputted in a form added to image data of the next line newly stored, as shown in FIG. 12C. As a result, there may be the case where the DC level changes greatly at the timing of DC clamping, thereby making it impossible to make a response to a normal offset not later than an effective line for rereading shown in FIG. 12E (or effective image data for rereading). For example, when the light-shielded output signal generation time is 10 $\mu$sec for a clamp charging/discharging time constant of 10 $\mu$sec, a response (in the case where it is regarded as a transient response of a primary system) is on the order of about 63% (=1−exp(−10 $\mu$sec/10 $\mu$sec)) and hence an offset level at the time of buffer over-run becomes larger than a normal level (or the coupling condenser for clamp is excessively charged) so that the level of the line sensor output signal is apparently lowered. This means that each time an image rereading operation is performed, the rendering of gradation corresponding to several lines is deteriorated so that lateral stripes are generated.

In the conventional approach for solving such a problem, the speed-up of a clamp buffer is contemplated so that the response to the DC offset level is completed within the duration of one line clamp pulse. For example, as the speed of the system is increased, in order to obtain a response equal to or higher than 99% in the case of a light-shielded output signal generation time of 10 $\mu$sec, such a clamp buffer needs to have a charging/discharging time constant of 2 $\mu$sec which is equal to one fifth of 10 $\mu$sec. In order to ensure the charging/discharging time constant of 2 $\mu$sec, the ON resistance of an analog switching is 20 Ω in the case where a 0.1 $\mu$F coupling condenser is used. In the case where an ideal response as shown in FIG. 12D is not attained, the conventional approach includes a method which uses the fact that the response is nearly completed after, for example, five lines, that is, a method in which the timing of resynchronization of the horizontal synchronizing signal is set to five lines before the effective line for rereading and image data is made effective from image data read after the reading of image data corresponding to the five lines.

However, in the case where the speed of the line clamp response is increased by use of the high-speed clamp buffer, as mentioned above, there is a problem that in order to increase the speed of the line clamp charging/discharging response of the DC level, a clamp buffer involving a large amount of current flowing therethrough is needed, thereby increasing power consumption. Also, there is a problem in that the increase of noise components attendant upon variations in the power supply voltage caused the large amount of current deteriorates the S/N ratio of a read image.

In the above-mentioned method in which the horizontal synchronizing signal is resynchronized several lines before the point of time of reading restart, the adaptation of the moving speed of a carriage to a reading speed and the resynchronization of the horizontal synchronizing signal are made prior to the reading restart point of time and image data is made effective from image data read after reaching the actual reading restart point of time after several lines. Therefore, this method has a problem in that the moving amount of the carriage attendant upon the rereading operation becomes large.

Under the above circumstances, one of the requirements on the image reader associated with the resynchronization of a horizontal synchronizing signal is that even if the storage time of a line sensor output signal becomes shorter than the transfer time so that the level of the light-shielded output signal becomes abnormal, a disturbance of the image is not generated. Also, it is required that there be no need to cause a high-speed response of the clamp buffer. Further, it is required that even in the case where a rereading operation is performed, the positional deviation of the joint of images is not generated. Furthermore, it is required that the operation of a carriage until the restart of reading is minimized.

SUMMARY OF THE INVENTION

An object of the present invention is to provide an image reader in which the image is not disturbed even if the level of the light-shielded output signal becomes abnormally high there is no need for the clamp buffer to have a high-speed response, a joint between images does not deviate on position even in the case where a rereading operation is performed, and the operation of the carriage until the restart of reading can be minimized.

An image reader according to the present invention is constructed to have a light source with which an original is irradiated, a line sensor for performing the reading in a main scan direction for each line, an optical system which is movable relative to the original in a subsidiary scan direction of the original, a driving section for causing the relative movement of the original and the optical system in the subsidiary scan direction, a line clamp section for performing a line clamp for a DC level of an output signal of the line sensor, and a control section for controlling timing at which the line clamp is to be performed and controlling the presence/absence of the line clamp.

With this construction, there is obtained an image reader in which a disturbance of the image is not generated even if the level of the light-shielded output signal comes to an abnormal level, there is no need to cause a high-speed response of the clamp buffer, the positional deviation of the joint of images is not generated even in the case where a rereading operation is performed, and the operation of the carriage until the restart of reading can be minimized.

According to a first aspect of the present invention, there is provided an image reader which comprises a light source with which an original is irradiated, a line sensor for performing the reading in a main scan direction for each line, an optical system which is movable relative to the original in a subsidiary scan direction of the original, a driving section for causing the relative movement of the original and the optical system in the subsidiary scan direction, a line clamp section for performing a line clamp for a DC level of an output signal of the line sensor, and a control section for controlling a timing at which the line clamp is to be performed and controlling the presence/absence of the line clamp. In operation, the line clamp is not performed in the case where the level of a light-shielded output signal takes an abnormal level.

According to a second aspect of the present invention, there is provided an image reader having a construction in which the image reader according to the first aspect further comprises a horizontal synchronizing signal generating circuit for generating a horizontal synchronizing signal from a reference clock signal, and the control section resynchronizes the horizontal synchronizing signal generated by the horizontal synchronizing signal generating circuit. In operation, the line clamp is performed on the basis of the horizontal synchronizing signal.

According to a third aspect of the present invention, there is provided an image reader having a construction in which the image reader according to the second aspect further comprises a clamp pulse masking circuit for stopping the line clamp only in the case where the horizontal synchronizing signal generated by the horizontal synchronizing signal generating circuit is resynchronized. In operation, a line clamp pulse is masked at a point of time of resynchronization so that the line clamp is not performed.

According to a fourth aspect of the present invention, there is provided an image reader which comprises a light source with which an original is irradiated, a line sensor for performing the reading in a main scan direction for each line, an optical system which is movable relative to the original in a subsidiary scan direction of the original, a driving section for causing the relative movement of the original and the optical system in the subsidiary scan direction, a horizontal synchronizing signal generating circuit for generating a horizontal synchronizing signal from a reference clock signal, a control section for generating a resynchronizing signal which resynchronizes the horizontal synchronizing signal generated by the horizontal synchronizing signal generating circuit, and a horizontal synchronizing signal masking circuit for masking the horizontal synchronizing signal one time before a point of time of generation of the resynchronizing signal generated by the control section. In operation, an image signal output from the line sensor is stopped by the masking of the horizontal synchronizing signal.

According to a fifth aspect of the present invention, there is provided an image reader having a construction in which the image reader according to the fourth aspect further comprises a line clamp section for performing a line clamp for a DC level of an output signal of the line sensor by means of a line clamp pulse, and a clamp pulse masking circuit for masking the line clamp pulse one time before the point of time of generation of the resynchronizing signal generated by the control section. In operation, the line clamp is not performed in the case where the level of a light-shielded output signal takes an abnormal level.

DESCRIPTION OF THE PREFERRED EMBODIMENTS

First Embodiment

Figure 1:
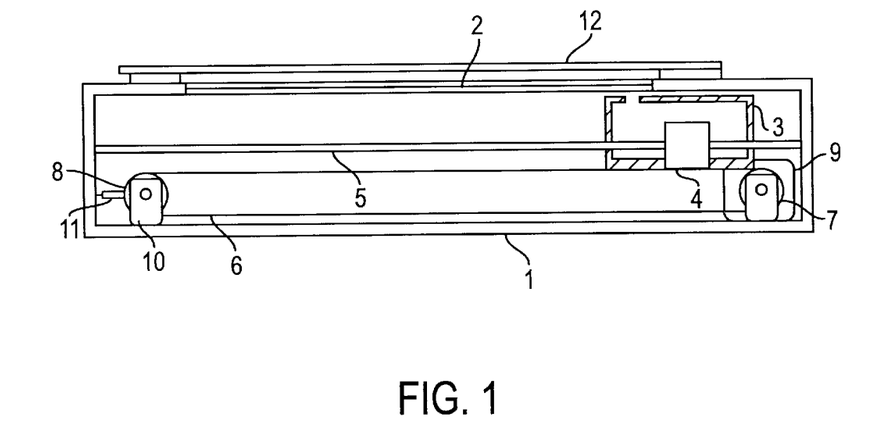
FIG. 1 is a cross section showing a general image reader.

FIG. 1 is a cross section showing a general image reader. As shown in FIG. 1, the image reader includes an image reader body 1, an original glass 2, a carriage 3, a supporting member 4, a shaft 5, a driving wire 6, a driving pulley 7, a driven pulley 8, a DC motor 9, a driven pulley supporting member 10, an energizing portion 11, an original cover 12, and so forth.

The original glass 2 is provided in order that a user can manually set an original. The carriage 3 scans the original to read it. The supporting member 4 has a bearing or the like therein and is mounted to the carriage 3. The shaft 5 supports the carriage 3 through the supporting member 4, and the movement of the carriage 3 is controlled by the shaft 5 only in a subsidiary scan direction. The driving wire 6 transfers a driving force to the carriage 3. The carriage 3 is connected to the drive transferring member or driving wire 6, and the driving wire 6 is coupled through the driving pulley 7 and the driven pulley 8. The driving pulley 7 is connected to the DC motor 9 by a connecting shaft and a reducing or decelerating mechanism (both not shown) to rotate the DC motor 9, thereby driving the carriage 3. The driven pulley 8 is energized by the energizing portion 11 through the driven pulley supporting member 10 to apply a tensile force to the driving wire 6. The original cover 12 brings the original into contact with the original glass 2.

Figure 2:
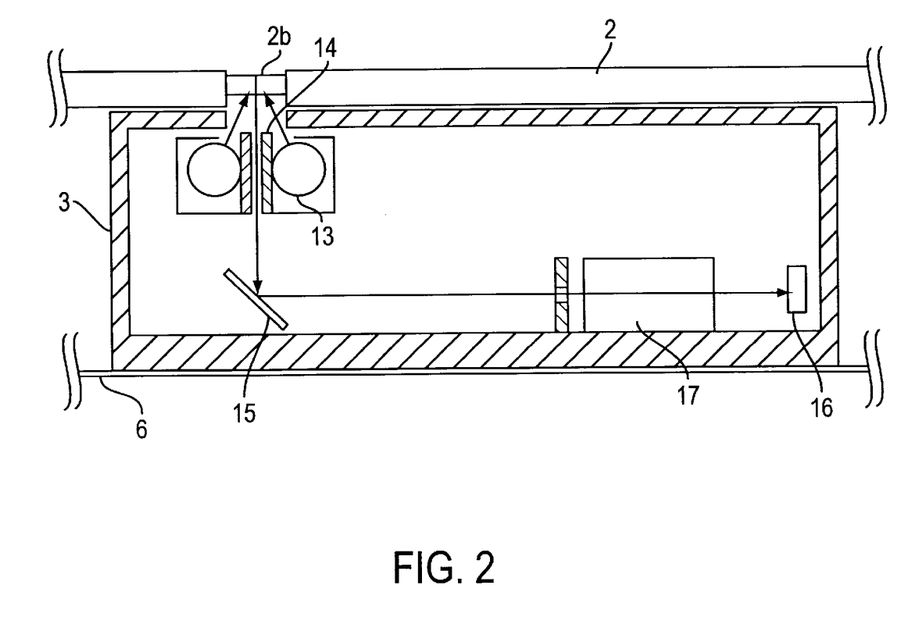
FIG. 2 is a diagram showing the construction of an optical system of the general image reader.

FIG. 2 is a diagram showing the construction of an optical system of the general image reader. In FIG. 2, an original glass 2, a carriage 3 and a driving wire 6 are similar to those shown in FIG. 1 and are designated by the same reference numerals as those used in FIG. 1. Therefore, the explanation thereof will be omitted. An original is irradiated with a light source 13 through a glass window 2b. An original reading portion is provided in the carriage 3, and an aperture 14 restricts a reading line width of the original reading portion in the subsidiary scan direction. A reflecting mirror 15 reflects light reflected from the original, and a line sensor 16 converts optical information into an electric signal. An imaging lens 17 forms an image of the original on the line sensor 16.

Figure 3:
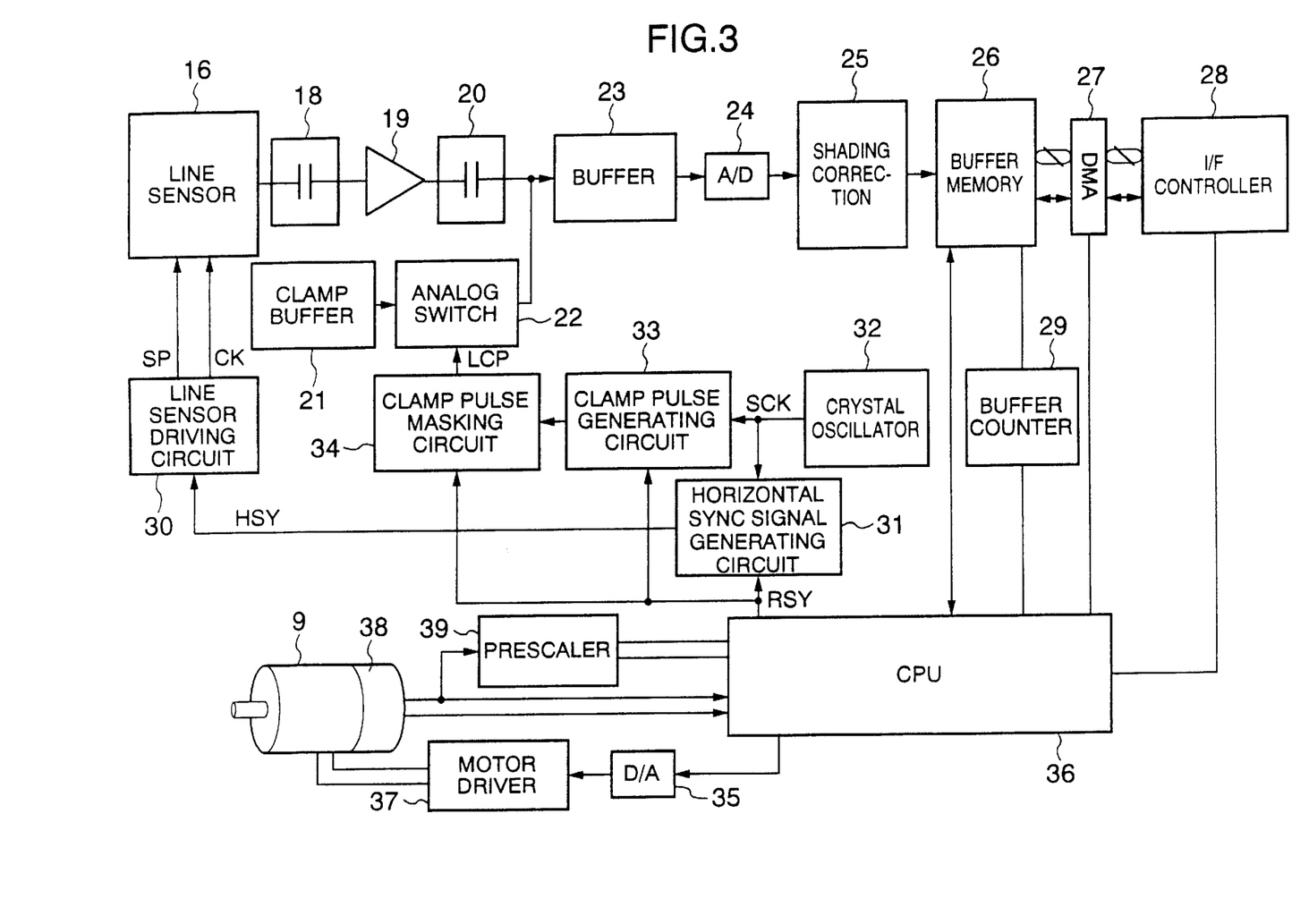
FIG. 3 is a block diagram showing an electrical system of an image reader according to a first embodiment of the present invention.

FIG. 3 is a block diagram showing an electrical system of an image reader according to a first embodiment of the present invention. In FIG. 3, an AC coupling condenser 18 transmits only an AC component of an output signal from the line sensor 16. An amplifier 19 amplifies the AC component from the line sensor 16. An AC coupling condenser 20 is provided for controlling the offset of the output signal from the line sensor 16. A clamp buffer 21 performs the charging/discharging at the time of clamp. An analog switch 22 causes the AC coupling condenser 20 to charge and discharge at the time of generation of a line clamp pulse. The AC coupling condenser 20, the clamp buffer 21 and the analog switch 22 form a line clamp section. An A/D converter 24 converts an analog signal from a buffer 23 into a digital signal. A shading correction circuit 25 performs a normalized correction for an original having a uniform density so that a uniform output signal level is obtained. A DMA controller 27 transfers output data of a buffer memory 26 to an external host device (not shown) directly with no intervention of a CPU (or control section) 36 and at a high speed. An interface controller 28 controls a data transfer for the external host device. A buffer counter 29 has an increase in its count value by the number of image data when the image data is written into the buffer memory 26 and has a decrease in its count value by the number of image data when the image data is transferred to the external host device. A line sensor driving circuit 30 drives the line sensor 16 and generates a shift pulse signal SP for each subsidiary scan position line and a transfer clock signal CK for each pixel which is to be outputted to the line sensor 16. A horizontal synchronizing signal generating circuit 31 has the function of dividing a reference clock signal SCK from a crystal oscillator 32 into a frequency determined by a reading resolution and resetting the timing of generation of a horizontal synchronizing signal by a resynchronizing signal RSY from the CPU 36. A clamp pulse generating circuit 33 has the function of dividing the reference clock signal SCK from the crystal oscillator 32 and resetting the timing of generation of a line clamp pulse by the resynchronizing signal RSY from the CPU 36. A clamp pulse masking circuit 34 masks a line clamp pulse LCP at the time of generation of the resynchronizing signal. A D/A converter 35 converts a digital signal output from the CPU 36 into an analog signal to control a motor driver 37 so that the rotating direction and the rotating speed of the DC motor 9 are controlled. The DC motor 9 and the motor driver 37 form a driving section. A motor encoder 38 generates two-phase pulses as the DC motor 9 is rotated. The two-phase pulses are counted by counters incorporated in the CPU 36 and are processed as the value of an absolute subsidiary scan position of reading. Also, only one phase of the two-phase motor encoder pulses is divided by a prescaler 39 into the value of a power designated by the CPU 36 and is then converted by the CPU 36 into speed information as the result of comparison with the reference clock. The rotating speed of the DC motor 9 can be controlled by comparing the speed information with a target speed and changing the value of a digital signal output from the CPU 36 to the D/A converter 35 in accordance with the result of comparison.

The operation of the image reader of the present embodiment, having the above-mentioned construction, will now be explained. When an original reading instruction is issued from the external host device in a state in which an original is placed on the original glass 2 and the original cover 12 is closed, the CPU 36 turns the light source 13 on and controls the motor driver 37 to rotate the DC motor 9 so that the carriage 3 coupled by the driving pulley 7 and the driving wire 6 is moved to a reading start position and is driven in the subsidiary scan direction at a fixed speed determined by a designated reading resolution. Also, a reading operation of the line sensor 16 is started by the line sensor driving circuit 30. The original is irradiated with the light source 13 through the glass window 2b. Reflected light from the original enters the interior of the carriage 3, with the reading line width in the subsidiary scan direction being restricted by the aperture 14. The incoming reflected light from the original is reflected by the reflecting mirror 15, imaged on the line sensor 16 by the imaging lens 17 and converted into an electric signal.

Next, the conversion to the electric signal will be explained. The horizontal synchronizing signal generating circuit 31 divides the reference clock signal SCK from the crystal oscillator 32 (which is a reference clock generating source) to generate the horizontal synchronizing signal HSY. The horizontal synchronizing signal generating circuit 31 can be reset by the resynchronizing signal RSY from the CPU 36. The line sensor driving circuit 30 converts the horizontal synchronizing signal HSY into the shift pulse signal SP. In substance, the shift pulse signal SP is the same as the horizontal synchronizing signal HSY. An image signal corresponding to one line is read in such a manner that, with the period of the shift pulse signal SP taken as a charge storage time, charges stored into a charge storage portion of the line sensor 16 in the charge storage time are shifted to a charge transfer portion thereof by the shift pulse signal SP and are successively transferred in the charge transfer portion in the next period. The image signal corresponding to one line is transferred as a serial electric signal for each pixel by a transfer clock signal CK from the line sensor driving circuit 30. As shown in FIG. 3, only an AC component of the image signal outputted from the line sensor 16 is thereafter transmitted by the AC coupling condenser 18 and is level-controlled by the amplifier 19. The image signal amplified by the amplifier 19 is clamped to a designated offset potential by virtue of a current carrying circuit from the clamp buffer 21 to the AC coupling condenser 20 which is formed when a line clamp pulse LCP outputted from the clamp pulse masking circuit 34 is active and the analog switch 22 is turned on. The line clamp pulse LCP is generated, through the division of the reference clock signal SCK from the crystal oscillator 32 by the clamp pulse generating circuit 33, at the timing of generation of a light-shielded output signal in the output signal c of the line sensor 16 shown in FIG. 9E. The line clamp pulse LCP can be reset by the CPU 36. The clamp pulse masking circuit 34 masks the clamp pulse from the clamp pulse generating circuit 33 only when the resynchronizing signal RSY is outputted from the CPU 36.

Thereafter, the image signal the offset of which is controlled through a DC clamp by the line clamp pulse LCP is converted by the A/D converter 24 into digital image data. The shading correction circuit 25 normalizes the image data inputted from the A/D converter 24 to obtain image data which has a uniform output level for an original having a uniform density. Only that one of image data obtained by the shading correction circuit 25, which is requested to be transferred to the external host device, is taken into the buffer memory 26 in accordance with the permission of the CPU 36 for writing while the count value of the buffer counter 29 is increased. In asynchronism with this operation, the image data taken in the buffer memory 26 is transferred by the DMA controller 27 to the external host device through the interface controller 28. At this time, the count value of the buffer counter 29 is decreased by the number of transferred data. Eight-bit rotation command data from the CPU 36 is converted by the D/A converter 35 into an analog rotation command signal which is in turn converted by the motor driver 37 into a current corresponding to the value of rotation command signal. With this current, the DC motor 9 is rotated. As the DC motor 9 is rotated, two-phase pulses are generated from the motor encoder 38. The two-phase pulses are counted by the counters incorporated in the CPU 36 and are processed as the value of an absolute subsidiary scan position of reading. Also, only one phase of the two-phase motor encoder pulses is divided by the prescaler 39 into the value of a power designated by the CPU 36 and is then converted by the CPU 36 into speed information. The CPU 36 compares the speed information with a target speed and outputs rotation command data corresponding to the result of comparison to the D/A converter 35, thereby making it possible to control the rotating speed of the DC motor 9 or the moving speed of the carriage 3 in the subsidiary scan direction.

Figure 4A:
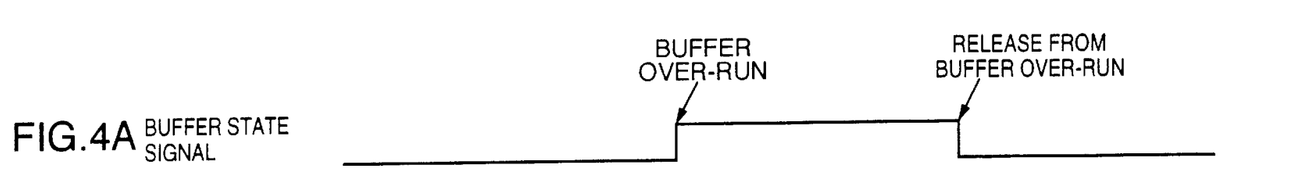
FIG. 4A is a timing chart showing a buffer state signal indicating the state of a buffer.
Figure 4B:
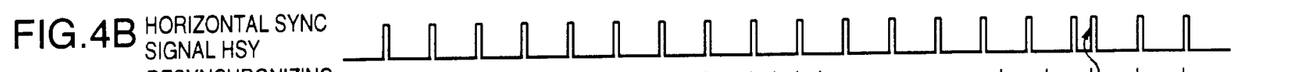
FIG. 4B is a timing chart showing a horizontal synchronizing signal.
Figure 4C:
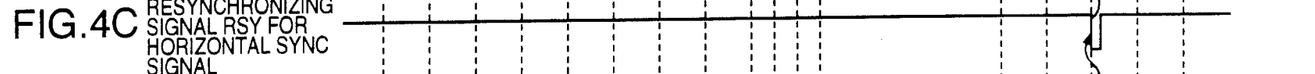
FIG. 4C is a timing chart showing a resynchronizing signal for horizontal synchronizing signal.
Figures 4D, 4E:
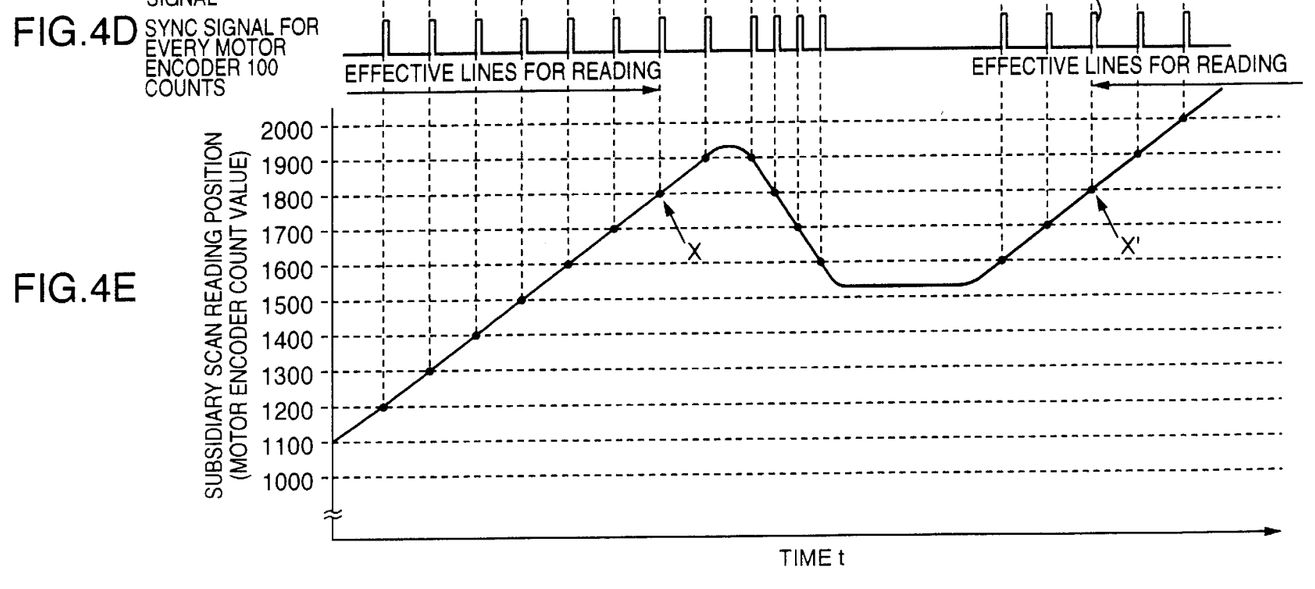
FIG. 4D is a timing chart showing a 100-count synchronizing signal.
FIG. 4E is a graph showing a motor encoder count value representing a subsidiary scan reading position.
Figure 5A:
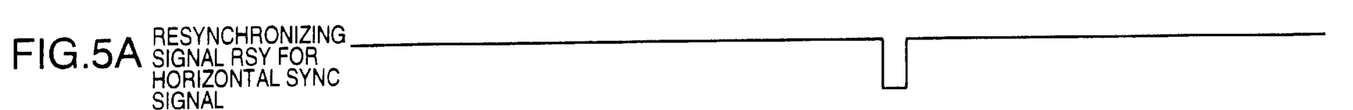
FIG. 5A is a timing chart showing a resynchronizing signal for horizontal synchronizing signal.
Figure 5B:
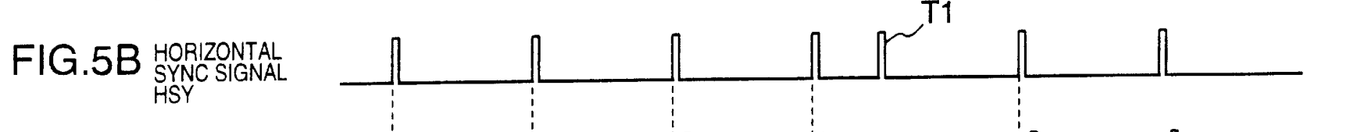
FIG. 5B is a timing chart showing a horizontal synchronizing signal.
Figures 5C, 5D:
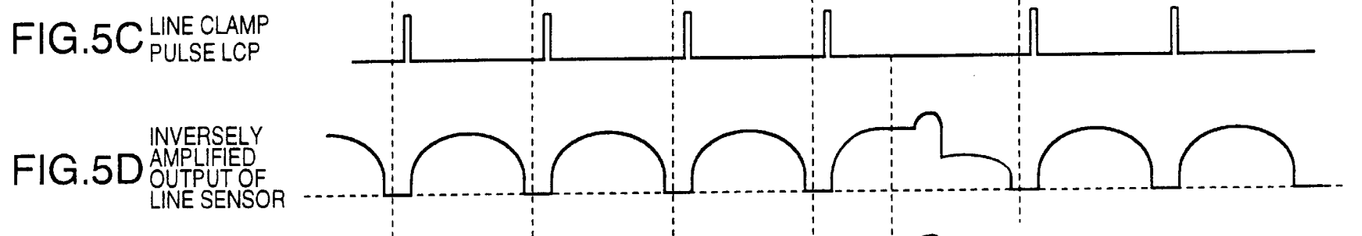
FIG. 5C is a timing chart showing a line clamp pulse.
FIG. 5D is a timing chart showing a signal obtained by inversely amplifying a line sensor output signal by an amplifier.
Figure 5E:
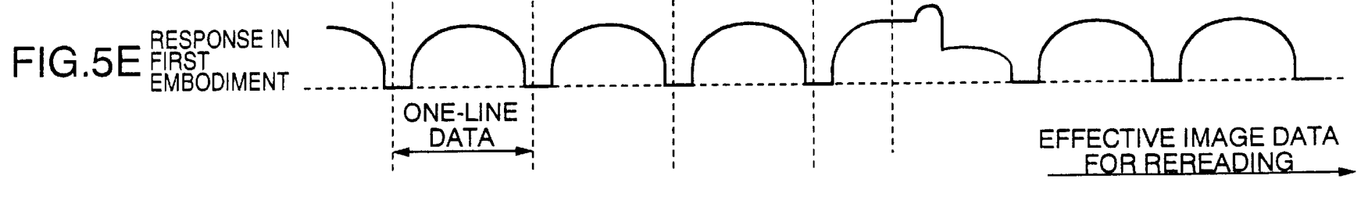
FIG. 5E is a timing chart showing a response outputted from a buffer after DC clamp.

Next, the DC clamp of the line sensor output signal in a rereading operation at the time of generation of a buffer over-run will be explained using FIGS. 4A to 4E and FIGS. 5A to 5E. FIG. 4A is a timing chart showing a buffer state signal indicating the state of the buffer, FIG. 4B is a timing chart showing the horizontal synchronizing signal HSY, FIG. 4C is a timing chart showing the resynchronizing signal RSY for horizontal synchronization, FIG. 4D is a timing chart showing a synchronizing signal generated each time a moter encoder count valve outputted from the moter encoder 38 is changed by 100 counts (hereinafter referred to as 100-count synchronizing signal), and FIG. 4E is a graph showing the moter encoder count valve representing the subsidiary scan reading position. Also, FIG. 5A is a timing chart showing the resynchronizing signal RSY horizontal synchronizing signal, FIG. 5B is a timing chart showing the horizontal synchronizing signal HSY, FIG. 5C is a timing chart showing the line clamp pulse, FIG. 5D is a timing chart showing a signal obtained by inversely amplifying the output signal of the line sensor 16 by the amplifier 19, FIG. 5E is a timing chart showing a response waveform outputted from the buffer 23 after the DC clamp by the line clamp pulse.

The buffer state signal shown in FIG. 4A is a signal indicating the state of the buffer memory 26 in which image data is temporarily stored. The buffer state signal can be regarded as a buffer over-run generation signal and a rereading operation start signal. The horizontal synchronizing signal HSY shown in FIG. 4B is a signal with a fixed period obtained from the reference clock signal SCK. The reading of an image is performed at the timing of the horizontal synchronizing signal HSY. The resynchronizing signal RSY for horizontal synchronizing signal shown in FIG. 4C is a signal generated by the 100-count synchronizing signal when the motor encoder count value comes to a count value at the point of time of generation of the buffer over-run. When the resynchronizing signal RSY becomes active (or is brought into a low condition), the horizontal synchronizing signal HSY is resynchronized. In FIG. 4E, the abscissa represents time and the ordinate represents a subsidiary scan reading position. In the shown example, the scale is represented on the assumption that the motor encoder count value representing an absolute subsidiary scan position is read for every 100 counts.

FIGS. 5A to 5E are shown for explaining the resynchronization of the line clamp pulse at the time of a rereading operation and the situation in which the line clamp pulse LCP is masked one time so that it is not outputted.

Now assume that the carriage 3 is being moved in the subsidiary scan reading direction from a reading start position at a speed determined by a reading resolution so that the motor encoder count value has exceeded the position of 1000 or the counting of 1100, 1200, is being made at a fixed period (see FIG. 4E). Though FIGS. 4A to 4E show these count points and the horizontal synchronizing signal HSY so that they are synchronous with each other, the horizontal synchronizing signal HSY is generated from the reference clock signal SCK whereas the motor encoder count value is generated at a fixed period by the above-mentioned speed control of the carriage 3 (that is, the control of the rotating speed of the DC motor 9). As shown in FIGS. 5A to 5E, the line clamp pulse LCP makes the analog switch 22 active so that the DC clamp can be performed at the same period as the horizontal synchronizing signal HSY and at the time of generation of the light-shielded output signal of the line sensor 16 (in the instant example, a period of time of 40 $\mu$sec subsequent to 200 $\mu$sec after the leading edge of the horizontal synchronizing signal HSY is taken as the light-shielded output signal generation period), that is, in the period of time of 40 μsec subsequent to 200 μsec after the leading edge of the horizontal synchronizing signal HSY. Accordingly, since the storage time of the line sensor 16 is always fixed and the DC clamp is performed by the light-shielded output signal for each line, the gradation of an image is faithfully rendered. As shown in FIGS. 4A to 4E, at a point of time when the motor encoder count value comes to 1800 in such a state and image data is taken in, the memory use amount of the buffer memory 26 becomes more than a predetermined value and hence the buffer state signal turns into a "H" level with the result that the buffer over-run is generated. In this case, image data stored in a storage time for the horizontal synchronizing signal HSY extending over the motor encoder count values of 1700 to 1800 are effective as image data. From that point of time, the DC motor 9 is controlled so that it is decelerated. The deceleration is continued until the motor encoder count value ceases from increasing (in the example shown in FIG. 4E, until a point of time when the motor encoder count value exceeds 1900). Thereafter, the carriage 3 is turned back by reversely rotating the DC motor 9 so that the motor encoder count value becomes smaller than 1800. At a stage of time at which the carriage 3 is sufficiently turned back (in the example shown in FIG. 4E, a stage of time at which the motor encoder count value becomes smaller than 1600), the DC motor 9 is controlled so that the carriage 3 is stopped. Thereafter, a wait is taken until the memory use amount of the buffer memory 26 becomes less than the predetermined value. When the buffer state signal turns into a buffer over-run release signal (or the buffer state signal turns into a "L" level), a re-reading operation is started to accelerate the carriage 3 in the subsidiary scan reading direction up to a reading speed. After the reading speed is attained, the speed is kept constant. At a point of time when the motor encoder count value comes to 1800 or a value at which the buffer over-run was generated some time ago, the resynchronizing signal RSY for horizontal synchronizing signal becomes active or turns into a low condition (see FIG. 5A) and the horizontal synchronizing signal HSY is resynchronized at a point of time T1 corresponding to the leading edge of the resynchronizing signal RSY. Thereafter, the horizontal synchronizing signal HSY takes a fixed period from that point of time and image data are written into the buffer memory 26 with the writing being performed from image data stored in the storage time for the horizontal synchronizing signal HSY extending over the motor encoder count values of 1800 to 1900. Also, the line clamp pulse LCP is similarly resynchronized 200 μsec after the point of time of resynchronization of the horizontal synchronizing signal HSY. However, the line clamp pulse LCP corresponding to one line is masked by the clamp pulse masking circuit 34 so that the analog switch 22 remains turned off. Thereafter, the line clamp pulse LCP takes a fixed period and performs the DC clamp at the time of generation of the light-shielded output signal of the line sensor 16. Thus, the image is read while the rereading operation is repeated at the time of buffer over-run generation. Though each of the buffer state signal, the horizontal synchronizing signal HSY, the 100-count synchronizing signal and the line clamp pulse LCP is active when it takes its "H" level whereas the resynchronizing signal RSY for horizontal synchronizing signal is active when it takes its "L" level, the logic may be either positive or negative. In FIGS. 4A–4E, a synchronizing signal (or the 100-count synchronizing signal) is generated for every 100 counts of the motor encoder count value. However, in the case where the motor encoder count value can be monitored in real time, it is not necessary to generate the 100-count synchronizing signal or the like. As shown in FIG. 4E, in the rereading operation, the carriage 3 is turned back down to 1600 or less counts (in terms of the motor encoder count value) which are 200 or more counts before a rereading position X. However, this turn-back distance may be arbitrary so long as it is not shorter than an introductory distance necessary for attaining a reading speed at a position X'. Though the same signal as the resynchronizing signal for horizontal synchronizing signal is used as the resynchronizing signal RSY inputted to the clamp pulse masking circuit 34, another signal may be used as the signal for masking the line clamp pulse LCP.

According to the present embodiment as mentioned above, since a line clamp pulse to be generated first after the point of time of resynchronization at the time of restarting of reading is masked, it is possible not to perform the first DC clamp for the line sensor output signal after the point of time of resynchronization and the turn-back distance of the carriage 3 can be made short within a range of distances not shorter than the ntroductory distance. Therefore, even if the level of a light-shielded output signal becomes abnormal level, a disturbance of the image is not generated. There is no need to cause a high-speed response of the clamp buffer. Also, even in the case where a rereading operation is performed, a positional deviation of the joint of images is not generated. Further, the operation of the carriage until the restart of reading can be minimized.

Second Embodiment

In an image reader according to a second embodiment of the present invention, a horizontal synchronizing signal one time before the point of time of resynchronization of the horizontal synchronizing signal is not outputted at the time of a rereading operation so that an abnormal signal is not outputted from a line sensor, thereby stabilizing the DC clamp. As a result, a light-shielded output signal level is prevented from coming to an abnormal level, thereby preventing the disturbance of an image.

A cross section and an optical system of the image reader according to the second embodiment of the present invention are similar to those shown in FIGS. 1 and 2.

Figure 6:
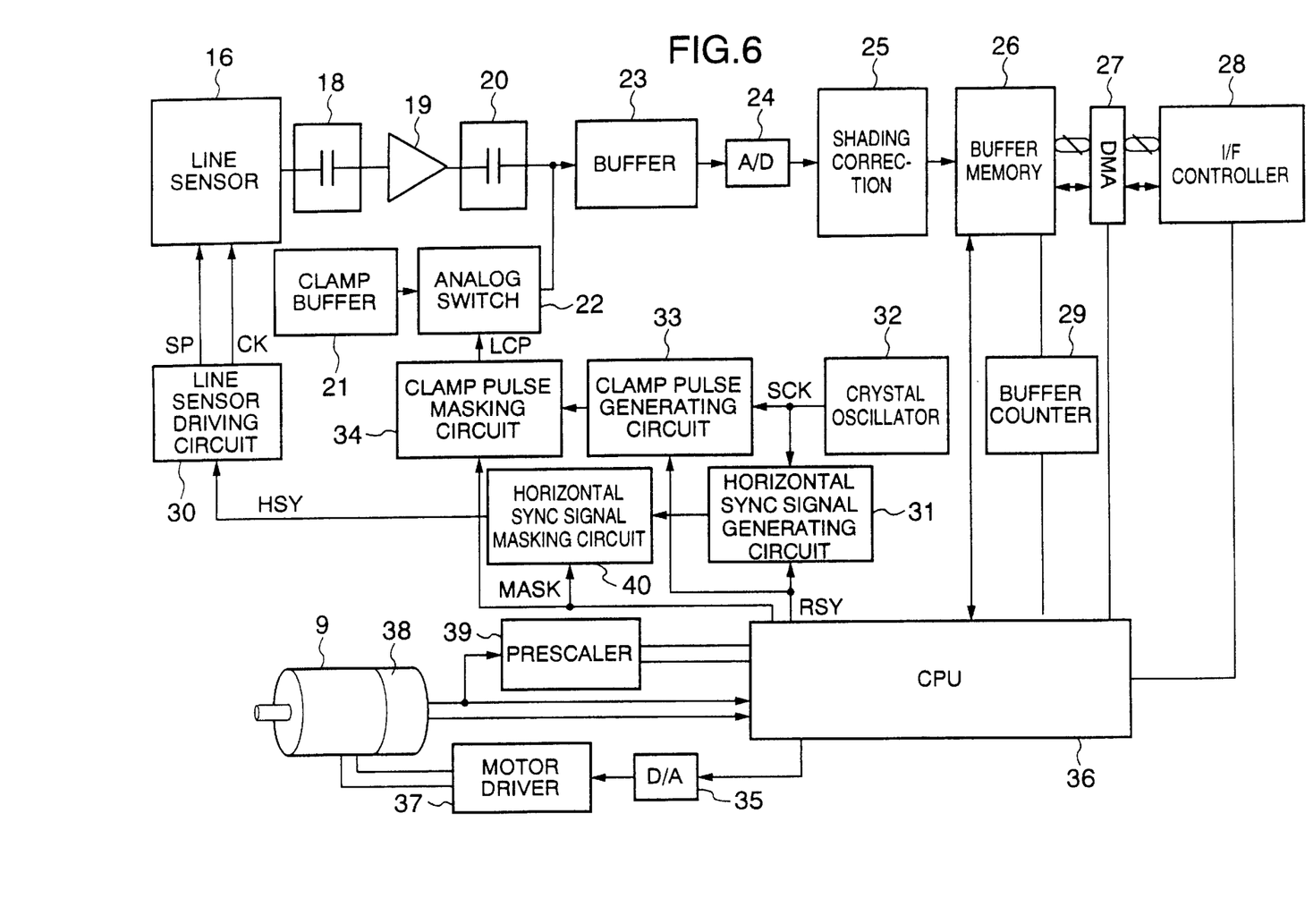
FIG. 6 is a block diagram showing an electrical system of an image reader according to a second embodiment of the present invention.

FIG. 6 is a block diagram showing an electrical system of the image reader according to the second embodiment of the present invention. In FIG. 6, a DC motor 9, a line sensor 16, an AC coupling condenser 18, an amplifier 19, an AC coupling condenser 20, a clamp buffer 21, an analog switch 22, a buffer 23, an A/D converter 24, a shading correction circuit 25, a buffer memory 26, a DMA controller 27, an interface controller 28, a buffer counter 29, a line sensor driving circuit 30, a horizontal synchronizing signal generating circuit 31, a crystal oscillator 32, a clamp pulse generating circuit 33, a D/A converter 35, a CPU 36, a motor driver 37, a motor encoder 38, and a prescaler 39 are similar to those shown in FIG. 3 and are designated by the same reference numerals as those used in FIG. 3. Therefore, an explanation of those components will be omitted. A horizontal synchronizing signal masking circuit 40 masks a horizontal synchronizing signal HSY outputted from the horizontal synchronizing signal generating circuit 31 when a masking signal MASK from the CPU 36 is active. Similarly, a clamp pulse masking circuit 34 masks a line clamp pulse LCP outputted from the clamp pulse generating circuit 33 when the masking signal MASK from the CPU 36 is active.

Figure 7A:
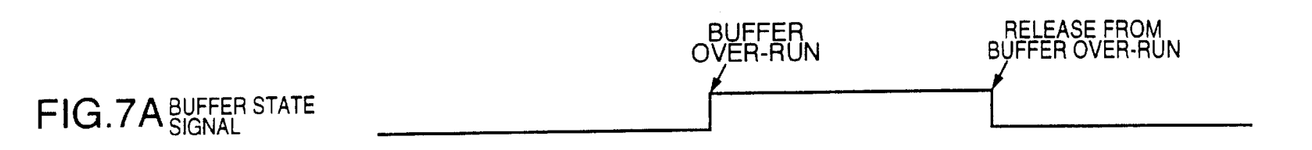
FIG. 7A is a timing chart showing a buffer state signal.
Figure 7B:
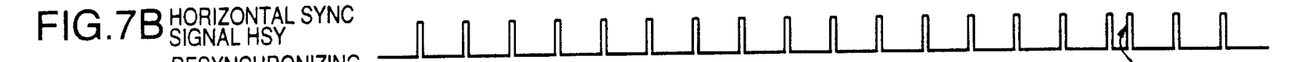
FIG. 7B is a timing chart showing a horizontal synchronizing signal.
Figures 7C, 7D, 7E, 7F:
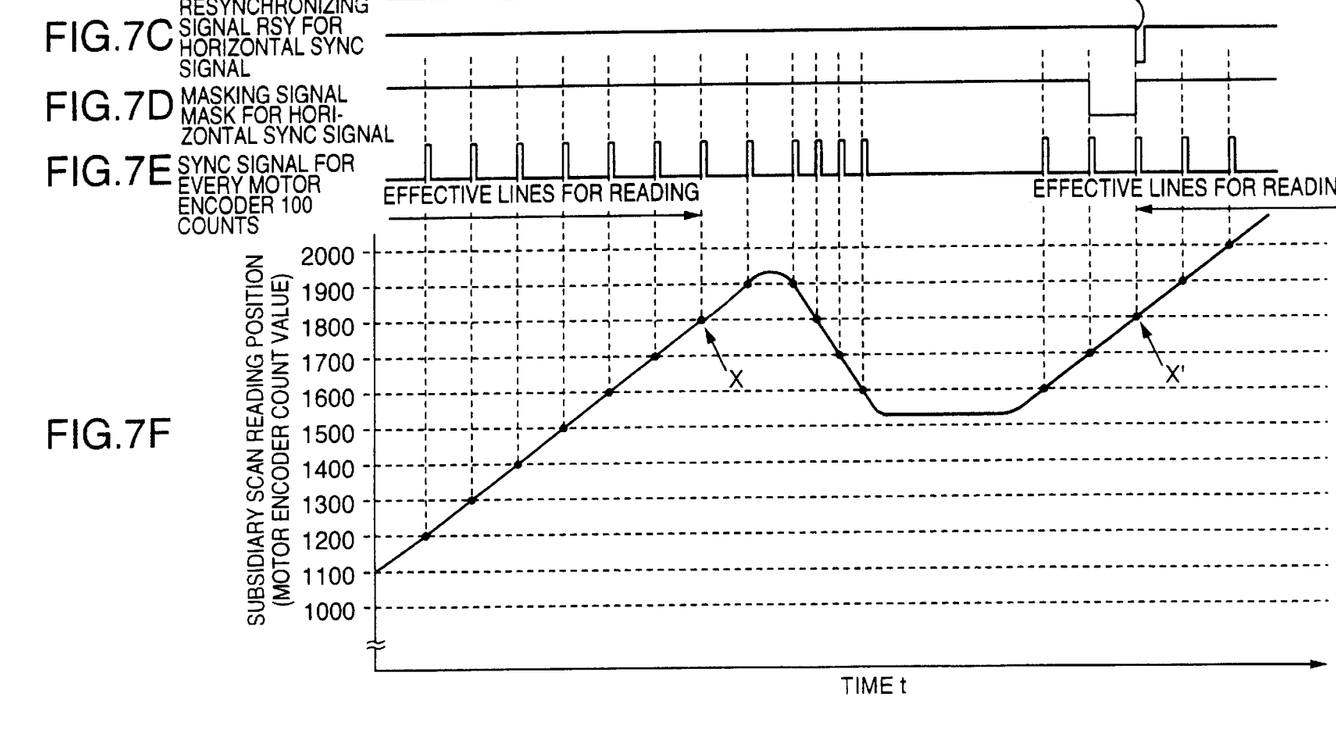
FIG. 7C is a timing chart showing a resynchronizing signal for horizontal synchronizing signal.
FIG. 7D is a timing chart showing a masking signal for horizontal synchronizing signal.
FIG. 7E is a timing chart showing a 100-count synchronizing signal.
FIG. 7F is a graph showing a motor encoder count value representing a subsidiary scan reading position.
Figure 8A:
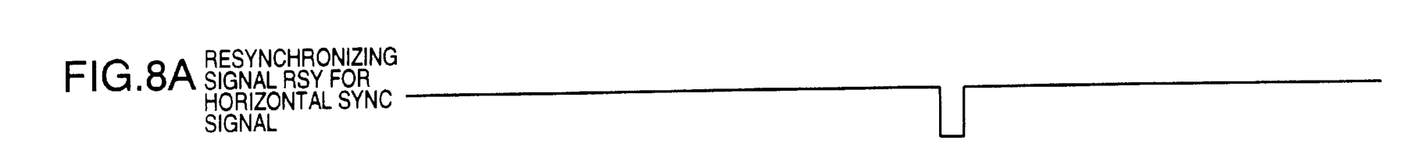
FIG. 8A is a timing chart showing a resynchronizing signal for horizontal synchronizing signal.
Figure 8B:
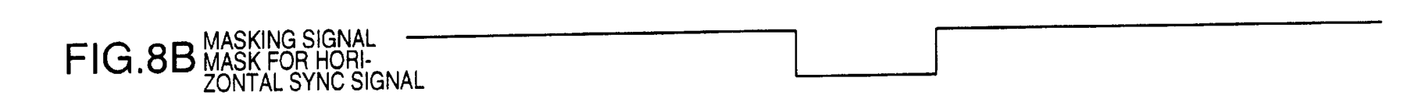
FIG. 8B is a timing chart showing a masking signal for horizontal synchronizing signal.
Figure 8C:
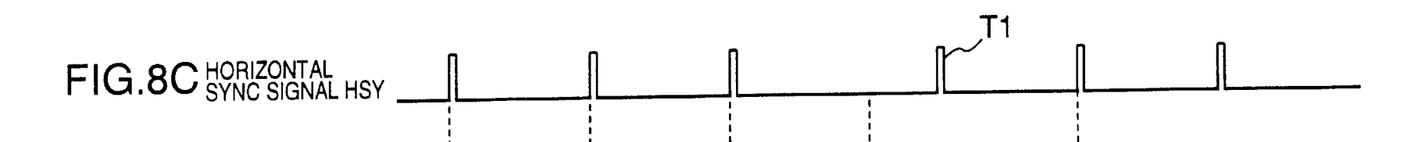
FIG. 8C is a timing chart showing a horizontal synchronizing signal.
Figure 8D:
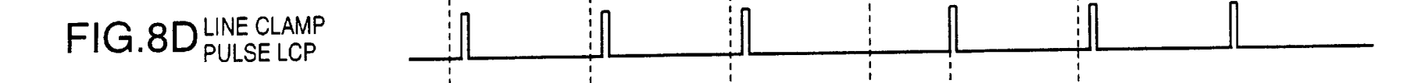
FIG. 8D is a timing chart showing a line clamp pulse signal.
Figures 8E, 8F:
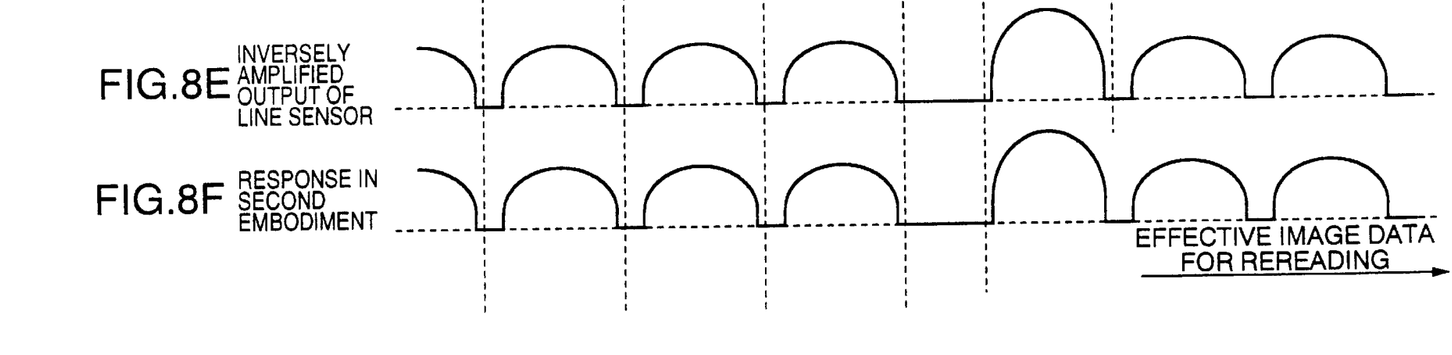
FIG. 8E is a timing chart showing a signal obtained by inversely amplifying a line sensor output signal by an amplifier.
FIG. 8F is a timing chart showing a response outputted from a buffer after DC clamp.

The operation of the image reader of the present embodiment having the above-mentioned construction will now be explained using FIGS. 7A to 7F and FIGS. 8A to 8F. FIG. 7A is a timing chart showing a buffer state signal indicating the state of the buffer, FIG. 7B is a timing chart showing the horizontal synchronizing signal HSY, FIG. 7C is a timing chart showing a resynchronizing signal RSY for horizontal synchronizing signal, FIG. 7D is a timing chart showing the masking signal MASK for horizontal synchronizing signal HSY, FIG. 7E is a timing chart showing a 100-count synchronizing signal, and FIG. 7F is a graph showing a motor encoder count value representing a subsidiary scan reading position. Also, FIG. 8A is a timing chart showing the resynchronizing signal RSY for horizontal synchronizing signal, FIG. 8E is a timing chart showing the masking signal MASK for horizontal synchronizing signal HSY, FIG. 8C a timing chart showing the horizontal synchronizing signal HSY, FIG. 8D is a timing chart showing a line clamp pulse LCP, FIG. 8E is a timing chart showing a signal obtained by inversely amplifying an output signal of the line sensor 16 by the amplifier 19, and FIG. 8F is a timing chart showing a response waveform outputted from the buffer 23 after DC clamp by the line clamp pulse LCP.

FIGS. 7A to 7F are shown for explaining the resynchronization of the horizontal synchronizing signal at the time of a rereading operation. The buffer state signal shown in FIG. 7A is similar to that in the case of the first embodiment. Namely, the buffer state signal is a signal indicating the state of the buffer memory 26 having image data therein stored temporarily and can be regarded as a buffer over-run generation signal and a rereading operation start signal. The resynchronizing signal RSY for horizontal synchronizing signal shown in FIG. 7C is a signal generated by the 100-count synchronizing signal when a motor encoder count value comes to a count value at a point of time of generation of a buffer over-run. When the resynchronizing signal RSY becomes active (or is brought into a low condition), the horizontal synchronizing signal HSY is resynchronized. The masking signal MASK for horizontal synchronizing signal shown in FIG. 7D is a signal which becomes active (or is brought into a low condition) 100 counts before a point of time when the motor encoder count value comes to a count value at the point of time of buffer over-run generation and which is returned into a negative (or high) condition when the motor encoder count value comes to the count value at the point of time of buffer over-run generation. Also, FIGS. 8A to 8F are shown for explaining the situation in which the horizontal synchronizing signal HSY at the time of a rereading operation is masked one time so that it is not outputted.

Since the operation of the image reader according in the present embodiment of FIG. 6 until the start of a rereading operation from the stop of the carriage 3 when the memory use amount of the buffer memory 26 becomes more than a predetermined value is the same as that in the first embodiment, the explanation thereof will be omitted. As shown in FIGS. 7A to 7F, at a point of time when the motor encoder count value is 1700 which is 100 counts before 1800 at the time of buffer over-run generation, the masking signal MASK (see FIG. 7D) becomes active (or is brought into a low condition). Thereby, the horizontal synchronizing signal masking circuit 40 does not output the next horizontal synchronizing signal HSY (see FIG. 7B). Thereafter, at a point of time when the motor encoder count value comes to 1800, the resynchronizing signal RSY for horizontal synchronizing signal becomes active or turns into a low condition (see FIG. 7C). At the same time, the masking signal MASK becomes negative (or is brought into a high condition). Thereby, the horizontal synchronizing signal HSY resynchronized at the leading edge of the resynchronizing signal RSY is generated and only the horizontal synchronizing signal one time before the point of time of resynchronization is masked. Thereafter, the horizontal synchronizing signal HSY takes a fixed period from the point of time of resynchronization and image data is written into the buffer memory 26 with the writing being performed from image data stored in a storage time for the horizontal synchronizing signal HSY extending over the motor encoder count values of 1800 to 1900 (or from effective image data for rereading shown in FIG. 8F). Also, as shown in FIG. 8D, the line clamp pulse LCP is similarly masked by the masking signal MASK from the CPU 36 in a period from a point of time of the motor encoder count value of 1700 until that of 1800 so that only the line clamp pulse LCP one time before the point of time T1 of resynchronization is masked. Thereafter, the line clamp pulse LCP takes a fixed period and the line clamp section performs the DC clamp at the time of generation of the light-shielded output signal from the line sensor 16. Thus, abnormal image data resulting from the addition of untransferred image data and newly stored image data is prevented from being outputted from the line sensor 16 and the line clamp one time before the point of time T1 of resynchronization is not performed. Therefore, it is possible to doubly prevent the disturbance of an image caused in the case where the light-shielded output signal level comes to an abnormal level. In FIG. 8E, the level of the inversely amplified output signal of the line sensor 16 at the point of time of restarting of reading is shown such that it is larger 10 than those at other timings. This is because the period of the horizontal synchronizing signal HSY immediately before the point of time of restarting of reading is elongated so that a storage time in the line sensor 16 is increased.

According to the present embodiment as mentioned above, since a horizontal synchronizing signal HSY one time before a point of time of resynchronization at the time of restart of reading is masked and a line clamp pulse LCP is also masked, it is possible to prevent abnormal image data from being outputted from the line sensor 16 and it is possible not to perform a DC clamp one time before the point of time of resynchronization. Also, the turn-back distance of the carriage 3 can be made short in a range of distances not shorter than an introductory distance. Therefore, it is possible to prevent the level of a light-shielded output signal from coming to an abnormal level. There is no need to cause a high-speed response of the clamp buffer. Also, even in the case where a rereading operation is performed, a positional deviation of the joint of images is not generated. Further, the operation of the carriage until the restart of reading can be minimized.

According to the image reader of the present invention as mentioned above, it can be constructed such that in the case where a light-shielded output signal outputted from a line sensor takes an abnormal level, a line clamp for a line sensor output signal is not performed. And, a moving speed with which the reading can be made sufficiently at a reading restart position suffices for a carriage. As a result, there are obtained advantageous effects that the disturbance of an image is not generated even if the light-shielded output signal level comes to an abnormal level, that there is no need to cause a high-speed response of a clamp buffer, that a positional deviation of the joint of images is not generated even in the case where a rereading operation is performed, and that the operation of the carriage until the restart of reading can be minimized.

Also, with a construction in which the line clamp is performed on the basis of a horizontal synchronizing signal, there is obtained an advantageous effect in that a masking control for the line clamp is facilitated.

Further, with a construction in which the line clamp is stopped only in the case where the horizontal synchronizing signal generated by a horizontal synchronizing signal generating circuit is resynchronized, there is obtained an advantageous effect in that it is possible not to perform the line clamp at a point of time of resynchronization.

Furthermore, with a construction in which in the case where a light-shielded output signal outputted from a line sensor takes an abnormal level, the masking of a horizontal synchronizing signal makes it possible to prevent an image signal from being outputted from the line sensor and a moving speed with which the reading can be made sufficiently at a reading restart position suffices for a carriage, there are easily obtained advantageous effects that the disturbance of an image is not generated even if the light-shielded output signal level comes to an abnormal level, that there is no need to cause a high-speed response of a clamp buffer, that a positional deviation of the joint of images is not generated even in the case where a rereading operation is performed, and that the operation of a carriage until the restart of reading can be minimized.

Still further, a construction comprising the horizontal synchronizing signal masking circuit as well as a line clamp section for performing the line clamp for the DC level of the output signal of the line sensor and a clamp pulse masking circuit for masking a line clamp pulse one time before a point of time of generation of a resynchronizing signal generated by a control section makes it possible to prevent abnormal image data from being outputted from the line sensor and makes it possible not to perform a line clamp one time before a point of time of resynchronization. As a result, there is obtained an advantageous effect in that it is possible to doubly prevent a disturbance of the image caused in the case where the light-shielded output signal level comes to an abnormal level.

What is claimed is:

1. An image reader, comprising:

a light source to illuminate an original;

a line sensor to read lines of the original in a main scan direction, the line sensor generating an output signal which contains image data;

an optical system to direct light reflected by the original to the line sensor, the optical system being movable relative to the original in a forward subsidiary scan direction an in a reverse subsidiary scan direction that is opposite the forward subsidiary scan direction, the forward and reverse subsidiary scan directions being transverse to the main scan direction;

a driving section to cause relative movements of the original and the optical system in the forward and reverse subsidiary scan directions;

a buffer; and first means, cooperating with the line sensor, for transferring image data to the buffer, the first means including second means for generating a horizontal synchronization signal for the line sensor, and for resynchronizing the horizontal synchronization signal during an initial portion of a relative movement between the optical system and the original in the forward subsidiary scan direction, a line clamp section to perform a line clamp for a DC level of the output signal of the line sensor, and third means for controlling the line clamp section so that line clamps are performed after pulses of the horizontal synchronization signal as image data is being transferred to the buffer, except when the horizontal synchronization signal is being resynchronized.

2. An image reader according to claim 1, wherein the second means comprises an oscillator.

3. An image reader according to claim 1, wherein the third means comprises a clamp pulse masking circuit which masks a pulse of the horizontal synchronization signal when then the horizontal synchronization signal is being resynchronized.

* * * * *